United States Patent
Yoon

(10) Patent No.: US 6,481,675 B1
(45) Date of Patent: Nov. 19, 2002

(54) OUTER TUBE SUPPORT PLATE STRUCTURE OF A GAS CYLINDER

(75) Inventor: Young Ki Yoon, Kyonggi-Do (KR)

(73) Assignee: Samhongsa Co., Ltd., Seoul (KR)

( * ) Notice: Subject to any disclaimer, the term of this patent is extended or adjusted under 35 U.S.C. 154(b) by 0 days.

(21) Appl. No.: 09/849,486

(22) Filed: May 7, 2001

(51) Int. Cl.[7] ............................................. F16M 11/00
(52) U.S. Cl. .................................. 248/161; 297/344.19
(58) Field of Search ........................... 248/161, 295.11, 248/296.1, 297.21, 631; 297/344.19, 344.18; 267/131

(56) References Cited

U.S. PATENT DOCUMENTS

| | | | | |
|---|---|---|---|---|
| 4,720,068 A | * | 1/1988 | Tornero | 248/161 |
| 5,833,182 A | * | 11/1998 | Maus | 248/161 |
| 5,833,322 A | * | 11/1998 | Barandiaran | 297/463.1 |
| 5,979,845 A | * | 11/1999 | Battey et al. | 248/161 |
| 6,007,044 A | * | 12/1999 | Harrer | 248/161 |
| 6,267,337 B1 | * | 7/2001 | Kulhavy | 248/161 |
| 6,276,756 B1 | * | 8/2001 | Cho et al. | 248/161 |

* cited by examiner

*Primary Examiner*—Ramon O. Ramirez
*Assistant Examiner*—Jon Szumny
(74) *Attorney, Agent, or Firm*—McGuireWoods LLP

(57) ABSTRACT

An engaging structure of a support plate and an outer tub which fixes a piston rod. The outer tub and the support plate are firmly fixed by the simple bending and curling. First pieces and second pieces are formed by minutely cutting the surface of a lower end of the outer tub in a same axis as the outer tub. The first pieces are bent by rolling the first pieces towards the inner side of the outer tub. A support plate is positioned on the bent first piece. The second pieces are fixed by curling the first pieces towards the support plate.

7 Claims, 4 Drawing Sheets

PRIOR ART

OUTER TUBE SUPPORT PLATE STRUCTURE OF A GAS CYLINDER

BACKGROUND OF THE INVENTION

1. Field of the Invention

The present invention relates to a gas cylinder used in a table, a chair, or the like, and more particularly to a structure which can firmly fixes the outer tub of the gas cylinder and a support plate with a low cost.

2. Description of the Prior Art

A conventional gas cylinder includes a spindle 20 which can be slidably moved along the inner surface of a tube guide 30 surrounded by an outer tub 100 in the same axis as the outer tub as shown in FIG. 1. A piston rod 15 connected to the spindle is fixed to a support plate 50 fixed to an end of the outer tub. A piston 10 which is fixed to one end of the piston rod so as to be slidably moved upward and downward by regulating a hydraulic pressure is installed in the spindle 20.

The above-mentioned gas cylinder fixes a sitting member of a table plate or a chair to the upper end portion of the spindle, and a support member is inserted into a lower portion of the outer tub.

Therefore, the load applied to the spindle is applied to a support plate 50 connected to the piston rod. A cushion rubber 36, a ball bearing 45 interposed between bearing support 40a and 40b are inserted into an end portion of the piston rod 15 to reduce the rotational frictional force of the spindle. The end portion of the piston rod into which the bearing support is inserted is fixed to a support plate 50 by using a clip 47.

The conventional structure in which the end portion of the outer tub 100 and the support plate 50 are fixed has an embossing as describe in U.S. Pat. No. 4,969,616 so that the support plate 50 is caught in the inner wall of the outer tub 100. A rim extended at the embossing portion is curled towards the support plate 50.

Further, a structure in which an end of an outer tub is embossed by making the shape of the support plate 50 and the lower end of the outer tub is curled as shown in FIG. 2 and a structure in which an uneven support plate 50 of inserted into an outer tub 100 and a support plate 50 and an outer tub 100 are embossed and the curling is omitted as shown in FIG. 3 have been suggested.

The above-mentioned structure was suggested to settle the problem by which the manufacturing processes are complex and the assembling cost is expensive. However, the shape of the embossing 60 is deformed when the rim 65 is curling and the support plate 50 is fixed. In the result, the shaking of the support plate is generated and the support plate is deformed.

SUMMARY OF THE INVENTION

The present invention has been made to solve the above-mentioned problem, and accordingly it is an object of the present invention to provide a structure which can firmly fixes the outer tub of the gas cylinder and a support plate with a low cost.

In order to achieve the above-mentioned object, the present invention provides a gas cylinder in which one end of a piston rod extending to the inner side of an outer tub is fixed to a support plate fixed to one end of the outer tub and a spindle connected to the other end of the piston rod is slidably moved along the piston rod in a same axis direction as the outer tub and an outer tub support plate fixing structure of a gas cylinder wherein a plurality of first and second pieces are formed along the end surface of the outer tub and a protruding portion is formed on the inner side of the outer tub and the support plate is positioned so as to make contact with the protruding portion and the support plate is fixed to the second piece is formed.

The protruding portion is formed by bending the first piece and the second piece is fixed so as to surround the support plate by curling the second piece towards the inner side of the outer tub.

The width of the first piece is equal to or smaller than the width of the second piece.

The width of the first piece is larger than the width of the second piece.

The diameter of the support plate is smaller than the diameter of the outer tub.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, preferred embodiments of the present invention will be explained in detail with reference to FIGS. 4, 5, and 6.

Figure 1:
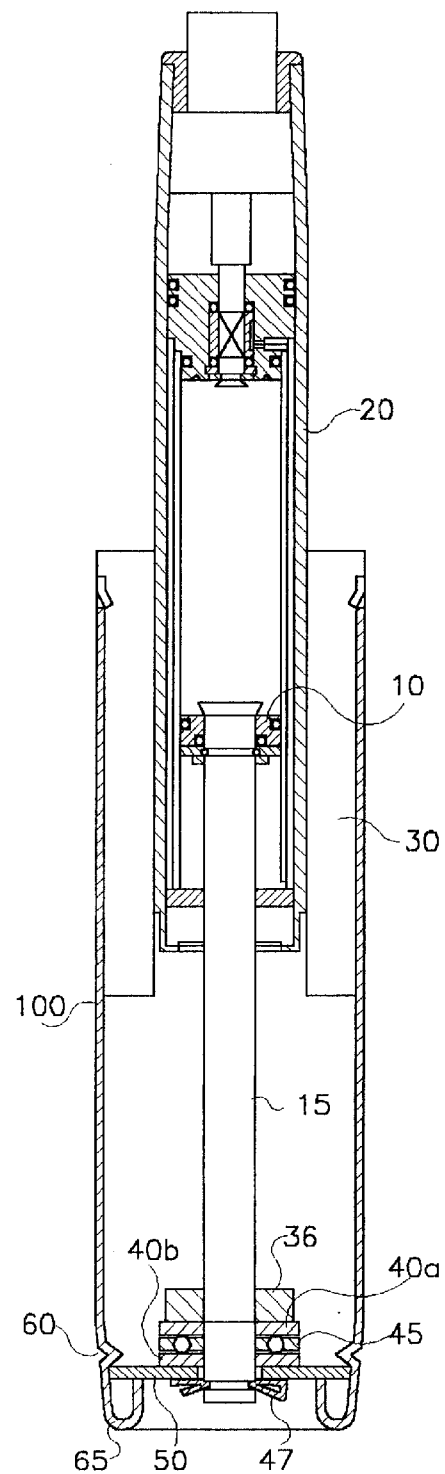
FIG. 1 is a cross-sectional view for showing a conventional gas cylinder.
Figure 2:
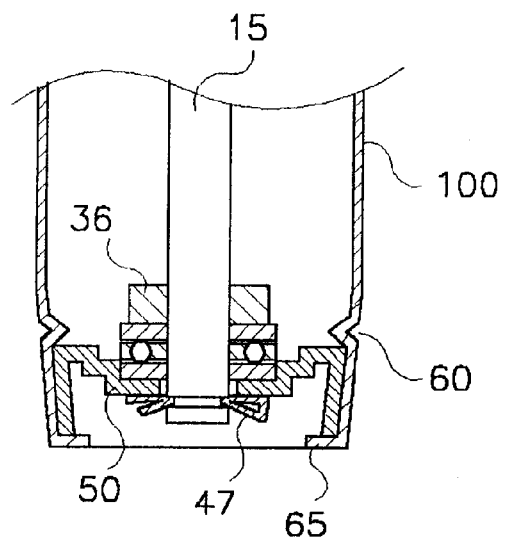
FIGS. 2 and 3 are cross-sectional views for showing a conventional structure of another example of an outer tub and a support plate.
Figure 3:
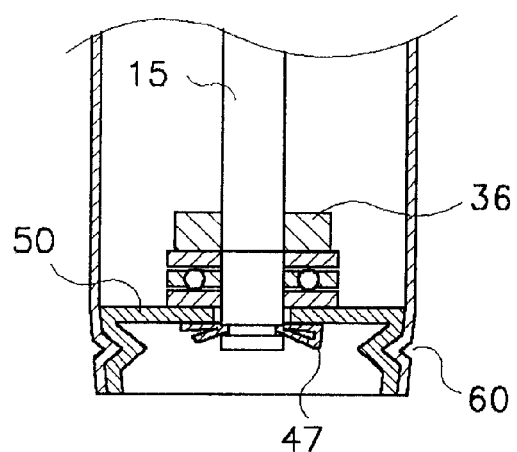
Figure 4:
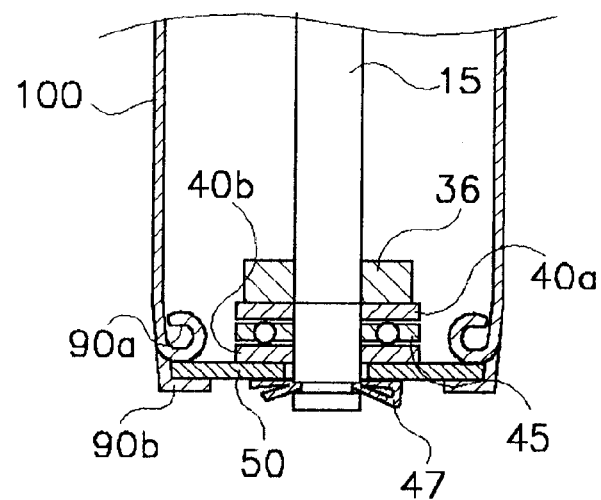
FIG. 4 is a cross-sectional view for showing a gas cylinder according to the present invention.
Figure 5:
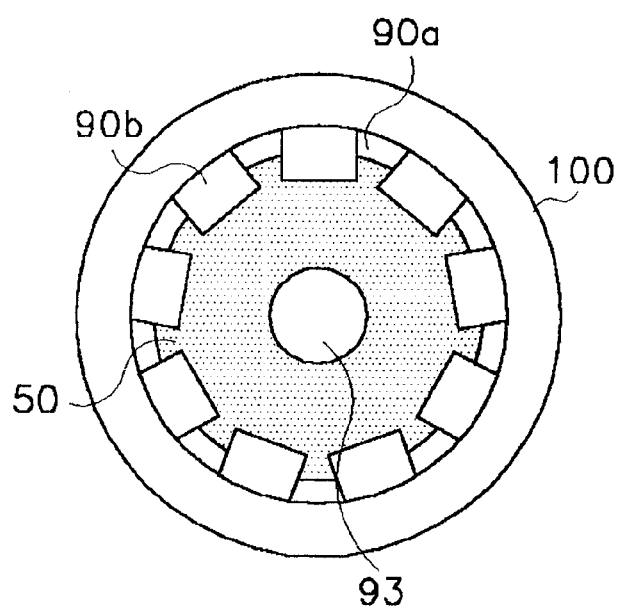
FIG. 5 is a rear view for showing the engaging structure of an outer tub and a support plate of a gas cylinder according to the present invention.
Figure 6:
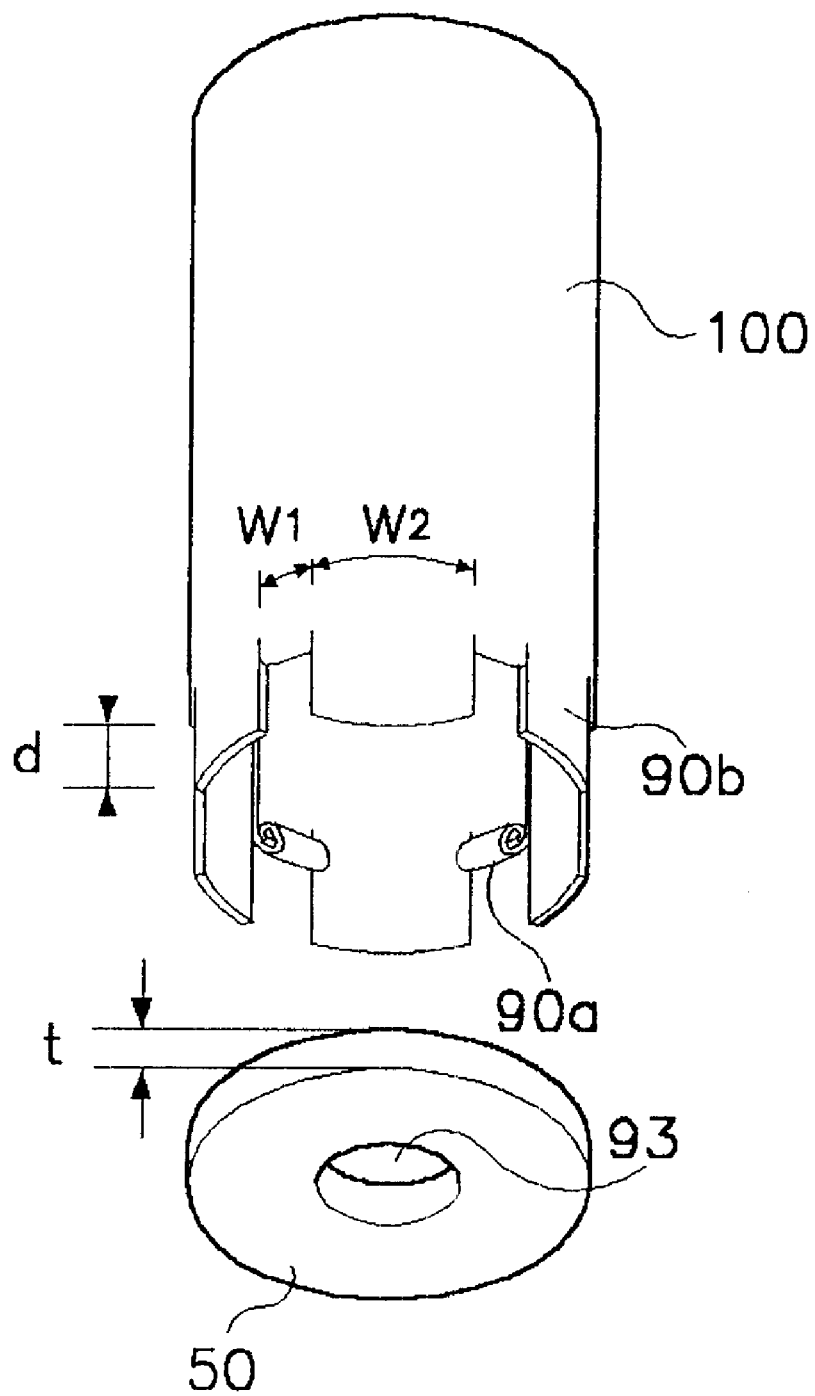
FIG. 6 is a view for showing the state before the outer tub of the gas cylinder and the support plate according to the present invention are engaged.

FIG. 4 is a cross-sectional view for showing a gas cylinder according to the present invention, and FIG. 5 is a rear view for showing the state in which an outer tub according to the present invention is engaged with a support plate, and FIG. 6 is a view for showing the state before the outer tub according to the present invention is engaged with the support plate.

As shown in the figures, the end surface of the outer tub 100 is minutely cut on a same axis as the outer tub, so that a first piece 90a and a second piece 90b which has a length d longer than the thickness t of the support plate 50 are plurally formed.

The width W of the first piece 90a is equal to or smaller than the width W2 of the second piece 90b, and the first piece is alternately disposed with the second piece.

Since the widths of the first piece and the second piece are determined considering the load applied to a spindle, the width of the first piece can be wider than the width of the second piece if the load does not matter.

The first piece 90a of the outer tub is bent and rolled towards the inside of the outer tub, and the support plate 50 in which a fixing hole 93 of a piston rod is formed is positioned on the first piece. The outer diameter of the support plate is smaller than the inner diameter of the outer tub to make the support plate contact with the rolled first piece.

The support plate 50 is supported by the first piece 90a bent in the interior of the outer tub 100, and the second pieces 90b are fixed so as to surround the support plate by curling the second pieces towards the inside of the outer tub, i.e., towards the support plate.

After the support plate 50 is fixed to the outer tub 100, a piston rod 15 into which a cushion rubber, a bearing supporter, and a ball bearing are inserted is inserted into the fixing hole 90 formed in the outer tub, and the piston and the support plate are fixed by using a clip 47.

According to the present invention, a first piece 90a and the second piece 90b are formed on the end surface of the outer tub 100, and the first piece is bent by rolling towards the inside of the outer tub, and the support plate is positioned on the first piece, and the second piece is curled so as to be fixed to surround the support plate.

In the support fixing structure according to the present invention, the first piece is completely separated from the second piece, and the first and second pieces are independently bent and curled. Therefore, the fixing structure is more stable and firm than the conventional fixing structure As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. In a gas cylinder in which one end of a piston rod extending to the inner side of an outer tube is fixed ta a support plate fixed to one end of the outer tube and a spindle connected to the other end of the piston rod is slidably moved along the piston rod in a same axis direction as the outer tube, wherein the outer tube includes a support plate fixing structure having a plurality of first pieces and a plurality of second pieces formed along the end surface of the outer tube, the plurality of first pieces include a contacting portion and the plurality of second pieces include another containing portion protruding within an inner side of the outer tube, wherein the contacting portion of the plurality of first pieces contact a first planar surface of the support plate and the contacting portion of the plurality of second pieces contact a second, opposing planar surface of the support plate such that the outer tube is fixed to the support plate.

2. The gas cylinder according to claim 1, wherein the contacting portions include a bait portion formed on the plurality of first pieces and curled portions formed on the plurality of second pieces curled towards the inner side of the outer tube.

3. The gas cylinder according to claim 1, wherein the width of the first pieces are equal to or smaller than the width of the second pieces.

4. The gas cylinder according to claim 1, wherein the width of the first pieces are larger than the width of the second pieces.

5. The gas cylinder according to claim 1, wherein the diameter of the support plate is smaller than the diameter of the outer tube.

6. A gas cylinder, comprising;
   a piston rod connecting to a supporting plate; and
   an outer tube having a first end and a second end, the first end having a first set of extending pieces and a separate set of second extending pieces, wherein
   the first set of extending pieces contact a first planar side of the supporting plate and the separate set of second extending pieces contact a second, opposing planar side of the supporting plate, and
   the supporting plate is fixed to the outer tube between the first set of extending pieces and the separate set of second extending pieces.

7. The gas cylinder according to claim 6, wherein the first set of extending pieces includes a bent portion which extends along the first side of the supporting plate and the separate set of second extending pieces includes a curled portion extending towards the inner side of the outer tube, the supporting plate being supported between the beat portion and the curled portion.

* * * * *

UNITED STATES PATENT AND TRADEMARK OFFICE
CERTIFICATE OF CORRECTION

PATENT NO. : 6,481,675 B1  Page 1 of 1
DATED : November 19, 2002
INVENTOR(S) : Young Ki Yoon It is certified that error appears in the above-identified patent and that said Letters Patent is hereby corrected as shown below:

<u>Title page,</u>
Item [57], ABSTRACT,
Lines 2, 5, 6 and 7, change "tub" to -- tube --.

<u>Column 1,</u>
Lines 9, 15, 18, 25, 35, 37, 40, 42, 44, 45, 63, 64, and 67, change "tub" to -- tube --;
Line 9, change "fixes" to -- fix --.
Line 59, change "fixes" to -- fix --.

<u>Column 2,</u>
Lines 3, 10, 16, 27, 33, 46, 48, 51, 52, 64, change "tub" to -- tube --.
Line 32, change "rear" to -- bottom --.
Line 45, change "rear" to -- bottom --.

<u>Column 3,</u>
Lines 2, 7, 9, 12, 17 and 18, change "tub" to -- tube --.
Line 25, insert a period -- . -- at the end of the sentence.
Line 36, change "ta" to -- to --.

<u>Column 4,</u>
Line 2, change "containing" to -- contacting --.
Line 10, change "bait" to -- bent --.
Line 40, change "beat" to -- bent --.

Signed and Sealed this

First Day of April, 2003

JAMES E. ROGAN
*Director of the United States Patent and Trademark Office*